(12) United States Patent
Guerrieri

(10) Patent No.: US 10,896,687 B2
(45) Date of Patent: *Jan. 19, 2021

(54) CROWDSOURCED NOISE MONITORING SYSTEMS AND METHODS

(71) Applicant: Microroyalties, LLC, Moffett Field, CA (US)

(72) Inventor: David A. Guerrieri, Sunnyvale, CA (US)

(73) Assignee: Microroyalties, LLC, Moffett Field, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/779,496

(22) Filed: Jan. 31, 2020

(65) Prior Publication Data

US 2020/0176016 A1    Jun. 4, 2020

Related U.S. Application Data

(63) Continuation-in-part of application No. 15/817,086, filed on Nov. 17, 2017, now Pat. No. 10,553,238.

(60) Provisional application No. 62/424,004, filed on Nov. 18, 2016.

(51) Int. Cl.
| | | |
|---|---|---|
| *H04R 3/00* | (2006.01) | |
| *H04R 29/00* | (2006.01) | |
| *G10L 25/51* | (2013.01) | |
| *G06F 16/61* | (2019.01) | |
| *G06F 21/60* | (2013.01) | |

(52) U.S. Cl.
CPC .............. *G10L 25/51* (2013.01); *G06F 16/61* (2019.01); *G06F 21/602* (2013.01); *H04R 29/00* (2013.01)

(58) Field of Classification Search
CPC .................. H04R 1/1083; H04R 3/005; H04R 29/00–008; H04R 2410/01; H04R 2410/03; H04R 2410/05; H04R 2410/07; H04R 2420/07; G10L 21/0208–0264; G10L 25/45; G10L 25/48; G06F 3/16; G06F 21/602
USPC ........ 381/91, 122, 56, 57, 71.2, 71.7, 71.13, 381/71.14, 94.1–94.8; 700/94
See application file for complete search history.

(56) References Cited

U.S. PATENT DOCUMENTS

| | | | | |
|---|---|---|---|---|
| 10,034,083 | B2 * | 7/2018 | Bostick ................. | H04W 4/029 |
| 10,444,062 | B2 * | 10/2019 | Zheng .................... | H04W 4/02 |
| 10,553,238 | B2 * | 2/2020 | Guerrieri .............. | H04L 67/125 |
| 2017/0142498 | A1 * | 5/2017 | Blong ................ | H04N 21/2665 |

\* cited by examiner

*Primary Examiner* — Xu Mei
(74) *Attorney, Agent, or Firm* — Carr & Ferrell LLP

(57) ABSTRACT

Systems and methods for crowdsourced noise monitoring are provided. An example for crowdsourced noise monitoring includes a noise monitoring system receiving and storing audio files and context data associated with a noise event in a database. A log of the audio files and context data can be created. Noise complaints can also be received from users by the noise monitoring system. Additional logs of the noise complaints can then be created. The log of the noise event and the additional logs of the noise complaints are analyzed to determine whether the noise complaints are related to the noise event. If the noise complaints are related to the noise event, the log and additional logs can automatically be forwarded to an authorized user.

22 Claims, 6 Drawing Sheets

CROWDSOURCED NOISE MONITORING SYSTEMS AND METHODS

CROSS-REFERENCE TO RELATED APPLICATIONS

The present application is a Continuation-in-Part of U.S. patent application Ser. No. 15/817,086 filed on Nov. 17, 2017, which in turn claims priority to U.S. Provisional Patent Application No. 62/424,004, filed Nov. 18, 2016 and titled "Crowdsourced Noise Monitoring." The disclosures of the above applications are incorporated by reference herein in their entirety, including all references cited therein.

FIELD OF THE INVENTION

The present invention relates generally to crowdsourced noise monitoring systems and methods, and more specifically, but not by way of limitation, using a combination of recorded noise events and noise complaints from users to substantiate and corroborate noise complaints.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The technology disclosed herein relates to systems and methods for crowdsourced noise monitoring. In an exemplary method for crowdsourced noise monitoring, the method includes: receiving, by one or more audio monitoring devices, audible sounds of a noise event; determining, by the one or more audio monitoring devices, whether a noise level of the noise event is above a threshold decibel level; if the noise level is above the threshold decibel level, recording, by the one or more audio monitoring devices, the audible sounds of the noise event, the recorded audible sounds comprising at least a first audio file and context data associated with the noise event; sending, by the one or more audio monitoring devices, the first audio file and context data to a noise monitoring system, the noise monitoring system in communication with the one or more audio monitoring devices via a network; storing, by the noise monitoring system, the first audio file and context data associated with the noise event in a database; and creating, by the noise monitoring system, a first log of the noise event, the first log comprising the first audio file and context data associated with the noise event.

In an exemplary system for crowdsourced noise monitoring, the system includes: (i) one or more audio monitoring devices, the one or more audio monitoring devices configured to: (a) receive audible sounds of a noise event; (b) determine whether a noise level of the noise event is above a threshold decibel level; and (c) if the noise level is above the threshold decibel level, record the audible sounds of the noise event, the recorded audible sounds comprising at least a first audio file and context data associated with the noise event; and (ii) a noise monitoring system in communication with the one or more audio monitoring devices via a network, the noise monitoring system being configured to: (a) receive the first audio file and context data associated with the noise event from the one or more audio monitoring devices; (b) store the first audio file and context data associated with the noise event in a database; (c) create a first log of the noise event, the first log including at least the first audio file and context data associated with the noise event.

In another exemplary method for crowdsourced noise monitoring, the method includes: (i) receiving audio files and context data associated with a noise event; (ii) storing the audio files and context data in a database; (iii) creating a first log of the audio files and context data; (iv) receiving a plurality of noise complaints from a plurality of users; (v) creating a plurality of second logs of the plurality of noise complaints; (vi) analyzing the first log and the plurality of second logs to determining whether the plurality of noise complaints are related to the noise event; and (vi) if the plurality of noise complaints are related to the noise event, automatically forwarding the first log and the plurality of second logs to an authorized user.

Other features, examples, and embodiments are described below.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The systems and methods disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
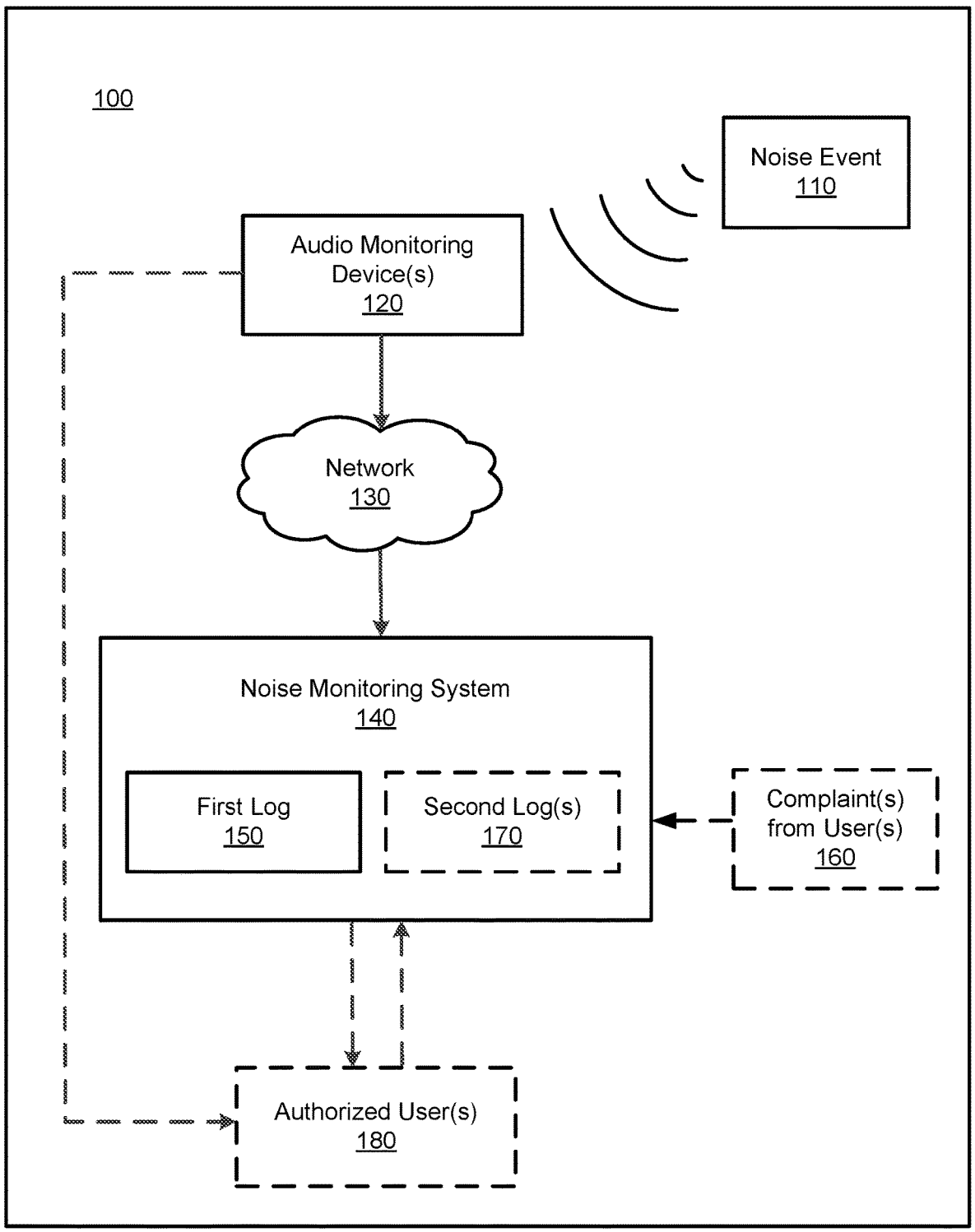
FIG. 1 is a block diagram illustrating an environment in which a method for crowdsourced noise monitoring can be practiced, according to an exemplary embodiment.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

In most cases, unsubstantiated noise complaints are not the best method for determining the success or failure of a public policy intended to mitigate noise in residential and commercial neighborhoods, or encouraging product designers to create less noisy products. A better method may include using a combination of noise complaints, calibrated decibel data, and other relevant data of recorded noise for a noise event. Using a combination of information sources for noise events can provide more useful information to policy makers and public safety departments for alleviating noise pollution in neighborhoods. The exemplary methods discussed herein can help policy makers, public safety departments, product manufacturers, private companies, communities, and the like, discern between false noise complaints and valid noise pollution or disturbances.

Further benefits of the presently disclosed method include empowering members of the community by providing them an opportunity to voice their complaints in a productive manner and to better cope with noise disturbances in their neighborhoods. In addition, putting into context and perspective various noise sources in a neighborhood can provide valuable trend data. Trend data may help measure progress towards quieter aircrafts and equipment (including, but not limited to, lawn or construction equipment) in the future. This may further incentivize designers and manufacturers of equipment to reduce noise-producing equipment designs if the noise can be measured and trended.

The embodiments described herein relate to systems and methods for crowdsourced noise monitoring.

FIG. 1 illustrates an exemplary environment in which crowdsourced noise monitoring can be practiced. In environment 100, when a noise event 110 occurs, one or more audio monitoring devices 120 receive and record audible sounds of the noise event 110, according to various embodiments. The frequencies of the audible sounds can be in the range of 20 Hz to 20,000 Hz. The environment 100 can be an outdoor area such as a residential neighborhood, a commercial or industrial area, transportation routes (e.g., for aircrafts, trucks, trains, buses, ships, carriers, delivery vehicles, etc.), constructions zones, arenas and stadiums, fire and police stations, schools, recreational areas (such as parks, hiking trails, and lakes), and the like. In other embodiments, environment 100 can be an indoor area, such as a residence or commercial building. Environment 100 may be a predefined area. In other embodiments, the environment 100 is any area in which there are audio monitoring devices 120. The audible sounds of the noise event 110 may include one or more noise sources present in the environment 100.

The audible sounds of the noise event 110 may be recorded by the audio monitoring device(s) 120 using standard audio file format including, but not limited to, MP3, Windows Media Audio (WMA), Waveform Audio File Format (WAV), Audio Interchange File Format (AIFF), Advanced Audio Coding (AAC), Vorbis/Ogg Vorbis, Free Lossless Audio Codec (FLAC), and the like, to create one or more digital audio files and associated context data. The audio files and associated context data may further be encrypted or password protected to prevent tampering. In addition to or in lieu of these security measures, further authenticity features may be included and/or required for access to the recorded audio file(s) and/or context data. The associated context data can include any relevant information regarding the noise event 110 and/or audio monitoring device(s) 120. For example, associated context data can include any one or more of location of audio monitoring device(s), estimated location of noise event 110, calibrated decibel level of the noise event 110, time and day of the noise event 110, known background noise sources in environment 100, user-input data, or any other relevant context data.

In some embodiments, the user-input data related to a noise event 110 can be textual data describing the noise event 110 from the perception of a user. For example, a user can input "this noise rattled my house and woke my baby!" In other embodiments, a user can include attachments, such as a picture of an object causing the noise event 110, a picture of environment 100 at the time the noise event 110 is heard, audio recording of the noise event 110, video recording of an object causing the noise event 110, video recording of environment 100 at the time the noise event 110 is heard, or any other relevant item, to enhance the user's witness and perception of the noise event 110. In this way, a noise event 110 can be correlated to a particular complaint from a user precisely when the noise event 110 occurred, and the complaint can be one of the items of context data included, in addition to the audio files (noise recording) of the noise event 110, according to various embodiments.

The audio monitoring device 120 may be weatherproof, encased in a weatherproof housing, or further adapted for outdoor use. The audio monitoring device 120 can be located on buildings and rooftops, yards and fields, utility poles, telephone poles, light poles, traffic signals, weather sensors and balloons, mobile units, and the like. The mobile units can be used for non-permanent areas and events such as construction zones, outdoor concerts, parades, etc. The audio monitoring device 120 may be owned by the government, private companies, homeowners, neighborhoods, community groups, and the like.

The audio monitoring device 120 may have a built-in global positioning system (GPS) to provide location information. The GPS information can be used to, for example, locate a particular audio monitoring device 120 (especially if the audio monitoring device 120 is used for mobile units), determine whether the audio monitoring device 120 has been moved from its original or intended location, and determine the relative position and proximity of one audio monitoring device 120 to other audio monitoring devices 120 or noise event 110.

In various embodiments, the audio monitoring device 120 can leverage the connectivity and electrical power of the device or structure to which it is coupled. For example, if the audio monitoring device 120 is coupled to a telephone pole, the audio monitoring device 120 can be configured to use both the electrical cable and electrical power of the telephone pole. In another example, if the audio monitoring device 120 is coupled to a weather sensor, the audio monitoring device 120 can be configured to use the network connectivity and electrical power of the weather sensor.

In some embodiments, the audio monitoring device(s) 120 can be wired and/or have wireless telecommunications and/or networking devices. The audio monitoring device(s) 120 can be electrically coupled or wired to a power source, a battery, or a combination of both, according to various embodiments. The battery can include one or more rechargeable and/or non-rechargeable batteries. In other embodiments, the audio monitoring device 120 can include or be coupled to a solar panel and be configured to use solar energy.

In other embodiments, the audio monitoring device 120 can have an integrated video recording device, such as a webcam or video recorder. In further embodiments, the audio monitoring device 120 can be in communication with, or coupled to one or more video recording devices.

The audio monitoring device(s) 120 can be in communication with a noise monitoring system 140 via a network 130. Examples of various networks include the Internet, Ethernet, Wi-Fi, a local area network (LAN), a wireless local area network (WLAN), a wide area network (WAN), a metropolitan area network (MAN), a cellular network, satellite communications, radio communications, and so forth. In various embodiments, the noise monitoring system 140 can reside on any of a designated server, web server, cloud server, virtual server, and the like. The audio monitoring device 120 can send the audio files and context data associated with the noise event 110 to the noise monitoring system 140 via the network 130. In various embodiments, the noise monitoring system 140 can store and create a first log 150 of the audio files and context data associated with the noise event 110.

In various embodiments, one or more video recording devices can also be in communication with the noise monitoring system 140 via the network 130. The video recording or video stream/feed can be used in conjunction with the audio files and context data associated with the noise event 110 to, for example, corroborate a noise event 110.

One of more of audio monitoring device(s) 120 may further be adapted for indoor use. Audio monitoring device(s) 120 may comprise a standalone microphone or a microphone embedded into an electronic device, such as a smartphone, tablet, laptop computer, security system, smart appliance, or home assistant device (such as an Amazon Echo, Google Home, etc.). Collectively the term "smart device" may be used herein to describe some of these devices.

In some embodiments, the noise monitoring system 140 can receive one or more complaints from one or more users 160. The complaint(s) from the user(s) 160 can be received from any method, including but not limited to, a telephone call, mobile phone call, mobile device application, software for a smart appliance, software for a security system, software for a home assistant device, short message service (SMS) message, voicemail, email, web server, and the like. The noise monitoring system 140 may then store and create one or more second logs 170 of the complaint(s) from the user(s) 160. The second log(s) 170 can include any of audio file, context data, name of user, form in which the one or more complaints was received (e.g., telephone call, mobile phone application, web server, etc.), text of the complaint (e.g., transcription of the telephone or mobile call or voicemail, content of text message or email, etc.) and the like. In an example embodiment, a user may be located inside a residence and hear a loud airplane flying overhead. The user may then call out "Alexa, record that noise" and the home monitoring device may operate as a noise monitoring device 120 and record the noise, the corresponding user instruction, and/or other relevant context information.

In further embodiments, the noise monitoring system 140 can analyze the second log(s) 170 to determine whether they are associated with the noise event 110 by comparing the first log 150 associated with the noise event 110 to the second log(s) 170 of the complaint(s) from the user(s) 160, for example, by comparing time stamps and/or other context data, or by the receipt of multiple complaints close in time and/or location to the noise event 110, and so forth. In various embodiments, the first log 150 and the second log(s) 170 may further be encrypted, password protected, or otherwise secured to prevent tampering. In addition to or in lieu of these security measures, further authenticity features may be included and/or required.

In further embodiments, the noise monitoring system 140 can calculate and store relevant data including the average and median noise levels of audio recordings based on time of day, decibel levels of various noise sources, and related context data. This information may be stored, for example, on a web server or the cloud, which can be made accessible only to one or more authorized users 180. For example, authorized user(s) 180 may be individuals affiliated with government institutions or regulators, local businesses, homeowner associations, private companies, owners of audio monitoring device(s) 120, administrators or owners of noise monitoring system 140, etc. These authorized users 180 may review the recorded noise events on a periodic basis or upon the meeting of a certain condition such as the receipt of multiple complaints. In other examples, the recorded noise events may be made available to the public or community, allowing residents to listen to the noise they are personally producing or the noise that is being produced in their neighborhood.

In other embodiments, the noise monitoring system 140 can analyze the first log 150 associated with the noise event 110 to determine what type of noise event occurred. Based on that determination, the noise monitoring system 140 can automatically forward the first log 150 associated with the noise event 110 to one or more corresponding authorized user(s) 180. In addition, if complaint(s) from user(s) 160 have also been received by the noise monitoring system 140, the noise monitoring system 140 can also forward the second log(s) 170 of the complaint(s) from the user(s) 160 to the authorized user(s) 180.

In some embodiments, the noise event 110 can be analyzed based on the character of the noise and the noise source to determine the appropriate authorized user(s) 180 and, in some cases, whether a notification should be sent to the authorized user(s) 180. The notification can include the first log 150 of the noise event 110 and optionally the second log(s) 170 of the complaint(s) from the user(s) 160, if available and necessary. For example, if the noise monitoring system 140 determines the noise event 110 is airplane noise, the noise monitoring system 140 can send a notification to the Federal Aviation Administration and/or the local airport authority. In other examples, determination of construction noise can lead to notification of the city, county, and/or construction company. Determination of a gunshot or car alarm noise can lead to notification of the city or county police, etc.

The noise monitoring system 140 may further assess the urgency of a particular noise event 110 to determine whether a notification should be sent to the authorized user(s) 180. For example, a gunshot may cause the noise monitoring system 140 to immediately send a notification to authorized user(s) 180, while construction noise would not. In this example, the first log 150 of the noise event 110 of the gunshot (and the second log(s) 170 of the complaint(s) from the user(s) 160, if any) can be sent in real time to the police for corroboration of the noise event 110.

In yet another embodiment, audio monitoring device(s) 120 can have an alert feature. The alert feature may be triggered, for example, by an absolute decibel level or predetermined threshold decibel level, or by a delta level above average or median noise levels. It will be noted that the triggering of the alert feature can be adjusted, for example, based on time of day or date, or by authorized user(s) 180. When triggered, the alert feature of the audio monitoring device 120 can send a notification of the noise event 110 to authorized user(s) 180. The notification may be an email report, automated voicemail, text message, instant messaging, or any other type of notification system or messaging. The notification can include any of the recording of the noise event 110, date and time stamps, location (e.g., GPS coordinates), and additional context data. The notification can further be encrypted or password protected such that only authorized user(s) 180 can access the information.

In other exemplary embodiments, entities that generate noise in environment 100 can access audio files and associated context data (or first log 150) of a noise event 110 to determine their own compliance with ambient noise standards, and the impact of their activities on noise levels at various places within their neighborhood or vicinity. Examples of noise generating entities in the environment 100 include, but are not limited to, an aircraft operator, airport, train operator, train station, bus station, other transit station, manufacturer, industrial plant, loudspeakers/microphones, emergency vehicles, law enforcement vehicles with sirens, leaf blowers, weed whackers, lawn mowers, other lawn equipment, construction equipment, construction sites, jackhammers, chainsaws, power drills, and noise from highways or other roadways. For example, this can lead manufacturers and operators to improve or create products that generate less noise, or encourage government officials to enforce noise requirements for construction zones, transportation zones, or other regulated areas.

In further exemplary embodiments, audio monitoring device(s) 120 can comprise an optional Automatic Dependent Surveillance-Broadcast (ADS-B) receiver (or transponder) to identify, for example, a particular aircraft in the area that may be causing a noise event 110. In one example, one or more users affected by the noise event 110 can be directly connected via electronic or network communication (such as email or mobile phone application, for example), to the pilot of the aircraft causing noise event, air traffic control personnel, airlines, airports, government entities, and the like. In resolving a noise complaint, the one or more users can discuss a particular noise event 110 with the pilot or officials in, for example, a moderated venue to resolve future noise events. The audio files and associated context data for the noise event 110 can be used to corroborate the noise complaint(s) or to identify various noise sources. This information pertaining to the noise event 110 can further be used in the planning of flight plans or flight patterns, for example. In other examples, pilots and airline personnel can access this information pertaining to the noise event 110.

In other exemplary embodiments, similar to the ADS-B transponder on aircrafts, other noise-producing devices can also have a transponder attached to it for the purpose of identifying noise sources, to help ensure compliance with policies of a community or government regulations, and the like. The transponder can provide information such as location, registration number, and other identifying information. For example, noise-producing equipment such as a weed whacker or lawn mower can be required to have a transponder that can provide relevant information for use in determining noise compliance, noise source, noise level, and the like.

Figure 2:
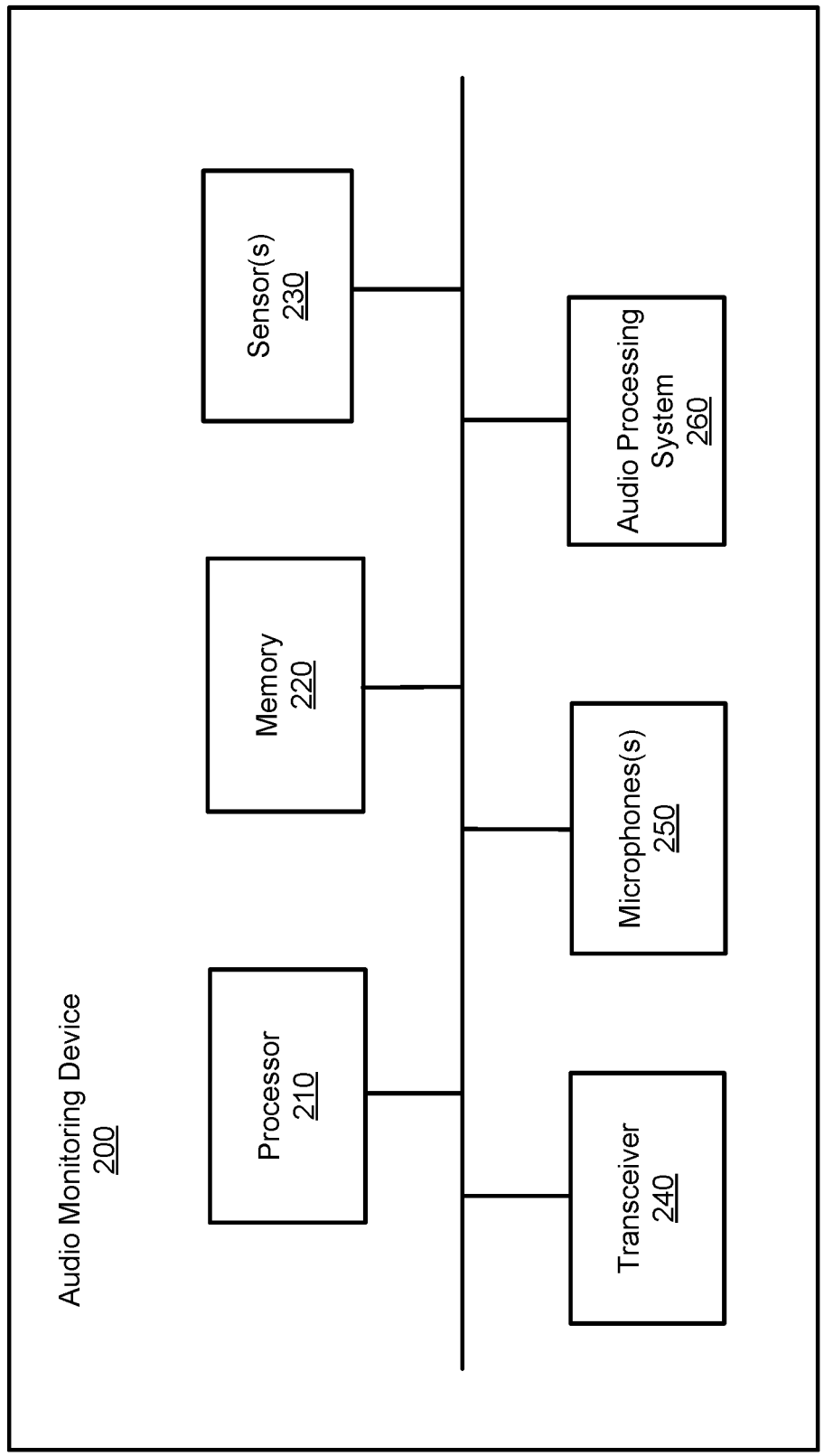
FIG. 2 is a block diagram illustrating an audio monitoring device, according to an exemplary embodiment.

FIG. 2 illustrates an exemplary audio monitoring device. Various embodiments of the audio monitoring device(s) 120 in FIG. 1 may be similar to audio monitoring device 200 as shown and described in FIG. 2. In the illustrated embodiment, audio monitoring device 200 includes processor 210, memory 220, sensor(s) 230, transceiver 240, microphone(s) 250, and audio processing system 260. In some embodiments, the audio monitoring device 200 can include additional or other components necessary for operation of the audio monitoring device 200. Similarly, in other embodiments, the audio monitoring device 200 can include fewer components that perform functions similar or equivalent to those depicted in FIG. 2.

In various embodiments, processor 210 includes hardware and/or software, which is operable to execute instructions stored in memory 220. The processor 210 may perform operations including noise detection. The processor 210 can include hardware and software that implement the processing of audio and/or video recordings and various other operations depending on the type of audio monitoring device 200, according to some embodiments. Memory 220 (e.g., a non-transitory computer readable storage medium) can be operable to store, at least in part, instructions and data for execution by processor 210.

Sensor(s) 230 of the audio monitoring device 200 include, but are not limited to, an acoustic sensor, light sensor, temperature sensor, humidity sensor, pressure sensor, motion detector, and the like. In some embodiments, the sensor(s) 230 are acoustic sensor(s) that can detect noise. This detection of noise at a predetermined decibel level may, for example, trigger the audio monitoring device 200 to record audio and/or video of a noise event. The audio monitoring device 200 may be in a low energy state until triggered. In other embodiments, the sensor(s) 230 can trigger the audio and/or video recording features of the audio monitoring device 200 to turn on or off based on, for example, detection of light, weather conditions, detection of a trigger word or sound, etc. The detection of various environmental conditions may further result in other functionalities of the audio monitoring device 200, such as collecting information regarding weather conditions (e.g., rain, thunder, wind, etc.) via sensor(s) 230, compensating or adjusting for noise produced by various weather conditions or known background noise sources (e.g., construction, airplanes, concerts, etc.) during the recorded noise event, and any other conditions that may affect the quality, decibel level, and the like of noise detected or recorded during the noise event. This further processing can occur at audio processing system 260 as further described below.

In some embodiments, the transceiver 240 is configured to communicate with a network to receive and/or transmit audio and/or video data of the noise event. Examples of various networks include the Internet, Ethernet, Wi-Fi, a local area network (LAN), a wireless local area network (WLAN), a wide area network (WAN), a metropolitan area network (MAN), a cellular network, satellite communications, radio communications, and so forth. It should be noted that, in other embodiments, in lieu or in addition to transceiver 240, the audio monitoring device 200 may have a separate receiver and/or transmitter, or other components with similar functionality.

In various embodiments, the audio monitoring device 200 can have one or more microphones 250. The one or more microphones 250 can receive audible sounds of the noise event. In other embodiments, the one or more microphones 250 can be various loudspeaker(s), noise recorder(s), and the like, or various combinations thereof.

The audio processing system 260 can be configured to receive and process audible sounds via the one or more microphones 250. The audio processing system 260 may also calculate the decibel level of the audible sounds. The audio processing system 260 may further calculate the decibel levels of multiple noise sources of the audible sounds. In other embodiments, the audio processing system 260 can further be configured to receive and process a video recording of the noise event.

Figure 3A:
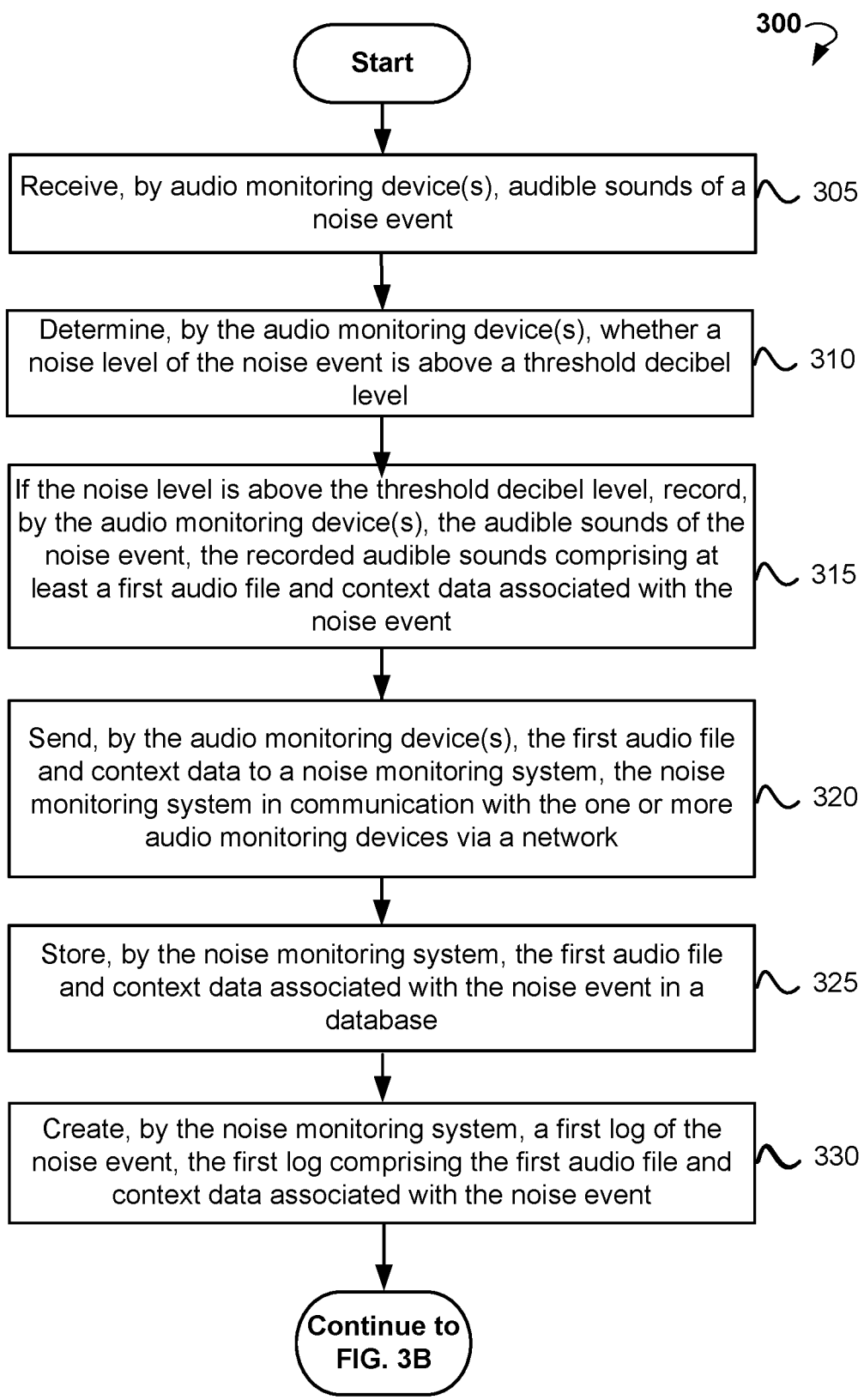
FIGS. 3A and 3B illustrate an example method for crowdsourced noise monitoring, according to an exemplary embodiment.
Figure 3B:
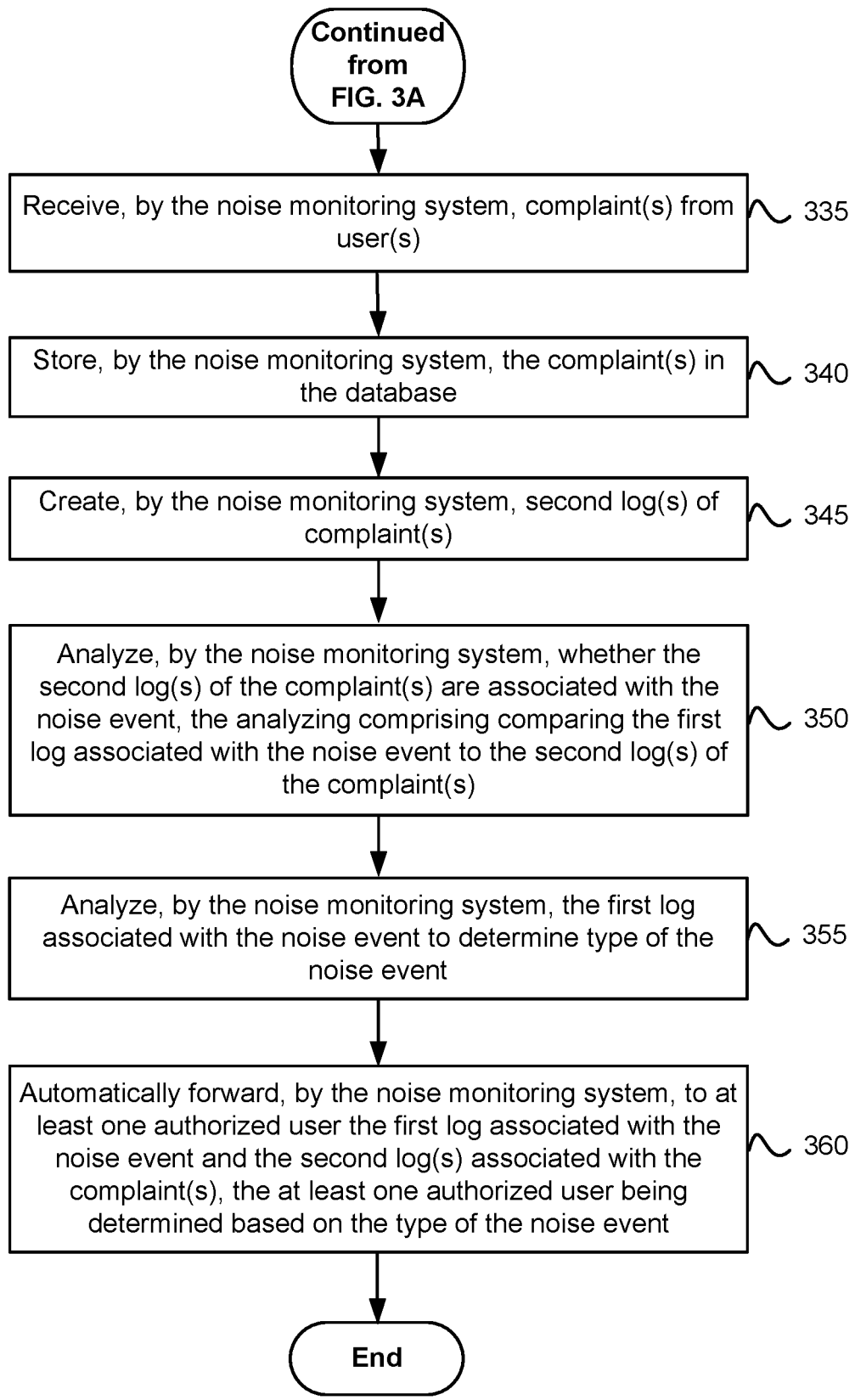

FIGS. 3A and 3B illustrate an example method for crowdsourced noise monitoring. The example method 300 can include all or some of the exemplary steps described below. In example method 300, at step 305, one or more audio monitoring devices can receive audible sounds of a noise event. At step 310, the audio monitoring device(s) can determine whether a noise level of the noise event is above a threshold decibel level. In one embodiment, the threshold decibel level can be determined by comparing the noise level of the noise event to a baseline noise level for a predefined area. In another embodiment, the threshold decibel level can be determined based on an average or median noise level for a predetermined time interval in a predefined area. The predetermined time interval may be at least one of time of day, time of week, period of time, and the like. At step 315, if the noise level is above the threshold decibel level, the audio monitoring device(s) can record the audible sounds of the noise event. The recorded audible sounds can include at least a first audio file and context data associated with the noise event. The recorded audible sounds may also include additional data.

It should be noted that, in other embodiments, there may be no determination of whether a noise level of the noise event is above a threshold level, as the audio monitoring device(s) may be recording continuously, recording based on time of day or date, recording based on a predetermined schedule, or recording as determined or as manually controlled by an authorized user, etc. That is, the audio monitoring device(s) can record the audible sounds of the noise event upon direction by a user, upon direction by a computing device. For example, an automated software program may direct the audio monitoring device(s) to automatically record sounds above a certain predetermined decibel threshold, or above a certain predetermined decibel delta from a current or usual background noise level, or upon the meeting of any other trigger configurable trigger condition.

At step 320, the audio monitoring device(s) can send the first audio file and context data to a noise monitoring system. The noise monitoring system can be in communication with the audio monitoring device(s) via a network. At step 325, the noise monitoring system can store the first audio file and context data associated with the noise event in a database. At step 330, the noise monitoring system can create a first log of the noise event. The first log may include the first audio file and context data associated with the noise event.

In further embodiments of method 300, at step 335, the noise monitoring system can receive one or more (noise) complaints from one or more users. At step 340, the noise monitoring system can store the complaint(s) in the database. At step, 345, the noise monitoring system can create one or more second logs of the complaint(s). At step 350, the noise monitoring system can analyze whether the second log(s) of the complaint(s) are associated with the noise event. The analyzing may include comparing the first log associated with the noise event to the second log(s) of the complaint(s).

At step 355, the noise monitoring system can analyze the first log associated with the noise event to determine a type of the noise event. At step 360, the noise monitoring system can automatically forward to at least one authorized user the first log associated with the noise event and/or the second log(s) associated with the complaint(s). The at least one authorized user can be determined based on the type of the noise event. As discussed herein, the type of noise event may be a classification of a noise source type, such as construction, transportation, entertainment, etc. The type of noise event may additionally or alternatively be classified in more granular detail, such as type of noise source (airplane, lawn equipment, construction equipment, train, bus, concert, etc.). Sub-classifications may also be determined, for example based on airplane size, etc. As would be understood by persons of ordinary skill in the art, the type of noise event can be configured by an authorized user of the noise monitoring system.

Figure 4:
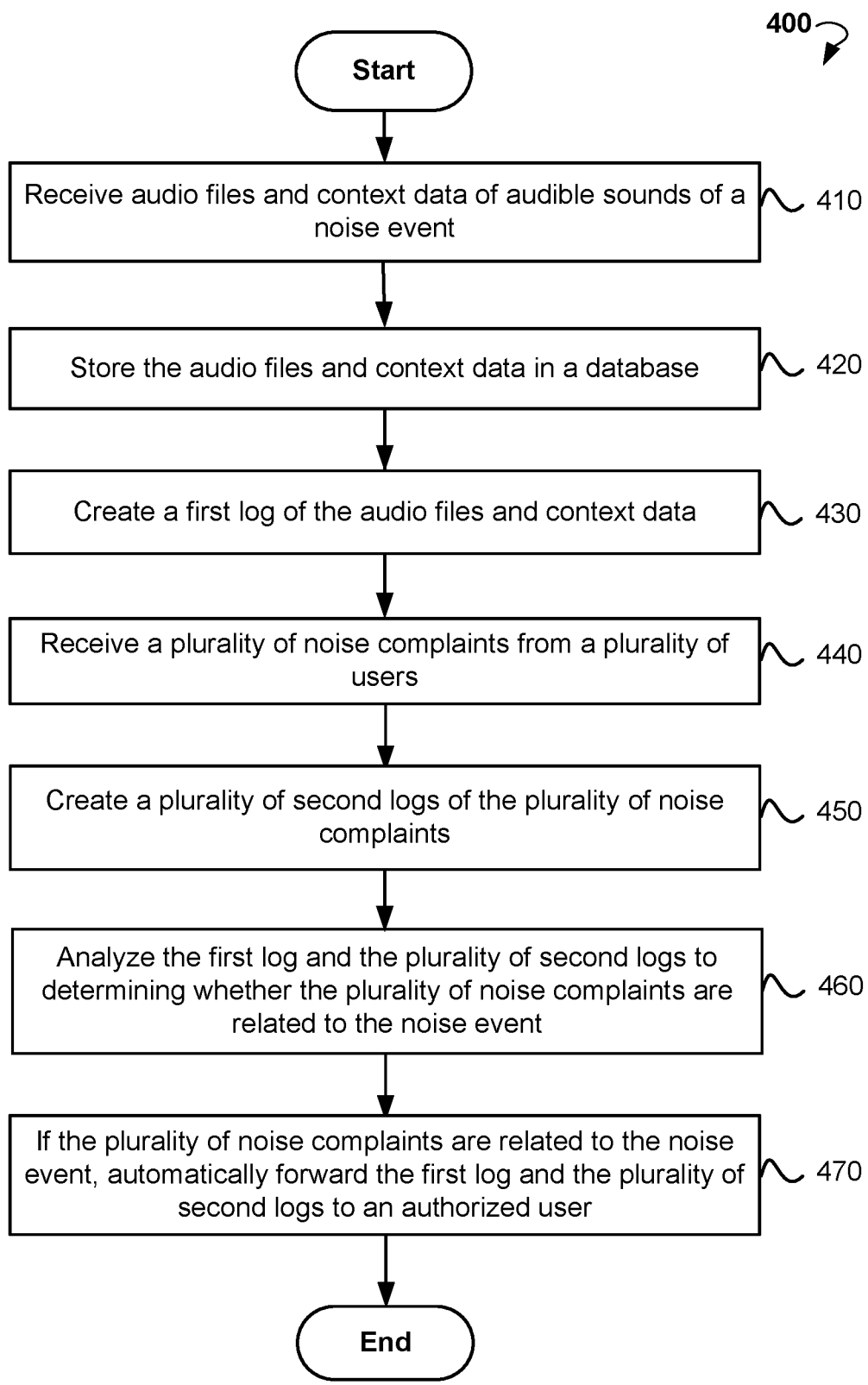
FIG. 4 is a flowchart illustrating another example method for crowdsourced noise monitoring using a noise monitoring system, according to an exemplary embodiment.

FIG. 4 is a flowchart illustrating another example method for crowdsourced noise monitoring using a noise monitoring system. The example method 400 can include all or some of the exemplary steps described below. In example method 400, at step 410, a noise monitoring system can receive audio files and context data of audible sounds of a noise event. At step 420, the noise monitoring system can store the audio files and context data in a database. At 430, the noise monitoring system can create a first log of the audio files and context data.

At step 440, the noise monitoring system can receive a plurality of noise complaints from a plurality of users. At step 450, the noise monitoring system can create a plurality of second logs of the plurality of noise complaints. At step 460, the noise monitoring system can analyze the first log and the plurality of second logs to determine whether the plurality of noise complaints are related to the noise event. At step 470, if the plurality of noise complaints are related to the noise event, the noise monitoring system can automatically forward the first log and the plurality of second logs to an authorized user.

Figure 5:
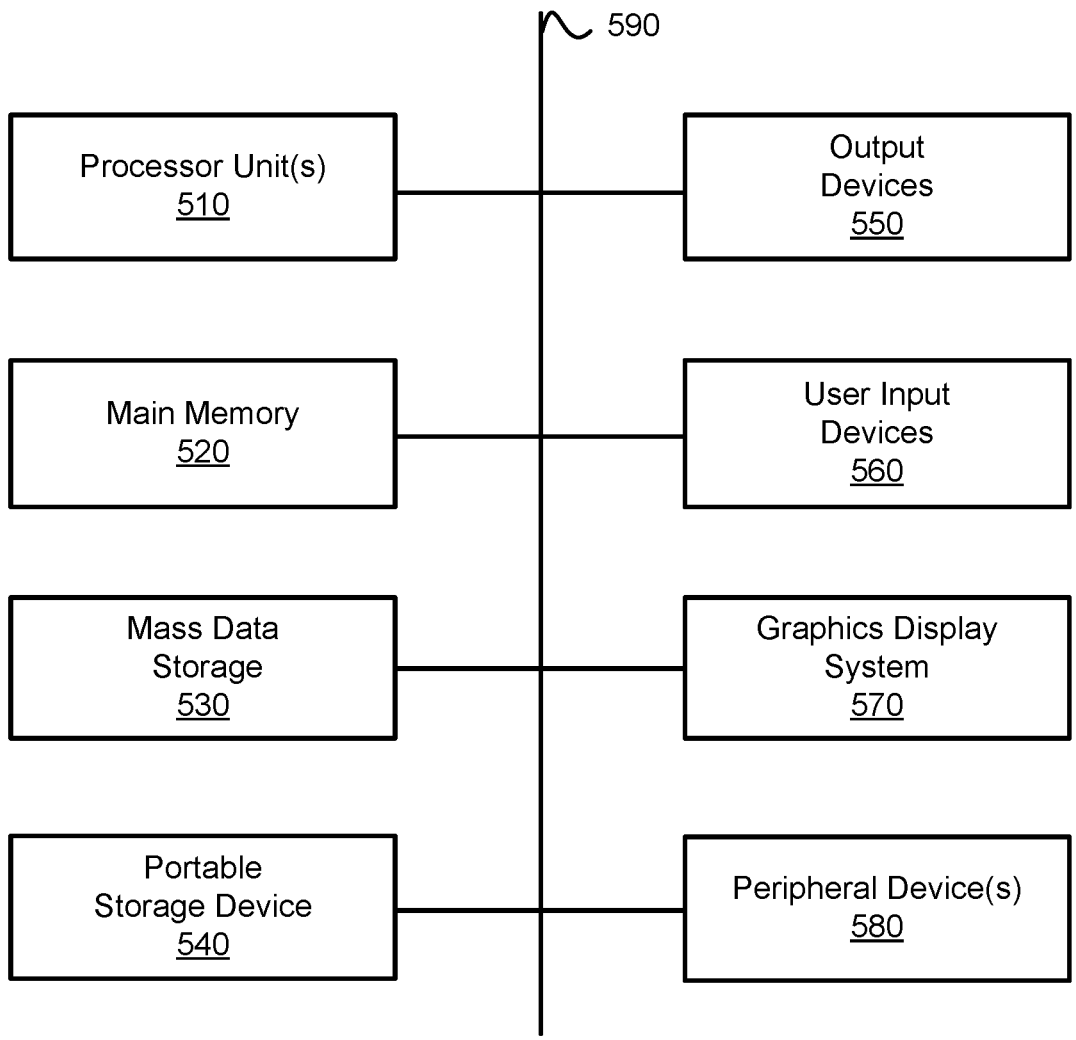
FIG. 5 illustrates an example of a computer system that can be used to implement embodiments of the disclosed technology.

FIG. 5 illustrates an exemplary computer system 500 that may be used to implement some embodiments of the present invention. The computer system 500 of FIG. 5 may be implemented in the contexts of the likes of computing systems, networks, servers, or combinations thereof. The computer system 500 of FIG. 5 includes one or more processor units 510 and main memory 520. Main memory 520 stores, in part, instructions and data for execution by processor unit(s) 510. Main memory 520 stores the executable code when in operation, in this example. The computer system 500 of FIG. 5 further includes a mass data storage 530, portable storage device 540, output devices 550, user input devices 560, a graphics display system 570, and peripheral device(s) 580.

The components shown in FIG. 5 are depicted as being connected via a single bus 590. The components may be connected through one or more data transport means. Processor unit(s) 510 and main memory 520 is connected via a local microprocessor bus, and the mass data storage 530, peripheral device(s) 580, portable storage device 540, and graphics display system 570 are connected via one or more input/output (I/O) buses.

Mass data storage 530, which can be implemented with a magnetic disk drive, solid state drive, or an optical disk drive, is a non-volatile storage device for storing data and instructions for use by processor unit(s) 510. Mass data storage 530 stores the system software for implementing embodiments of the present disclosure for purposes of loading that software into main memory 520.

Portable storage device 540 operates in conjunction with a portable non-volatile storage medium, such as a flash drive, floppy disk, compact disk, digital video disc, or Universal Serial Bus (USB) storage device, to input and output data and code to and from the computer system 500 of FIG. 5. The system software for implementing embodiments of the present disclosure is stored on such a portable medium and input to the computer system 500 via the portable storage device 540.

User input devices 560 can provide a portion of a user interface. User input devices 560 may include one or more microphones, an alphanumeric keypad, such as a keyboard, for inputting alphanumeric and other information, or a pointing device, such as a mouse, a trackball, stylus, or cursor direction keys. User input devices 560 can also include a touchscreen. Additionally, the computer system 500 as shown in FIG. 5 includes output devices 550. Suitable output devices 550 include speakers, printers, network interfaces, and monitors.

Graphics display system 570 include a liquid crystal display (LCD) or other suitable display device. Graphics display system 570 is configurable to receive textual and graphical information and processes the information for output to the display device.

Peripheral device(s) 580 may include any type of computer support device to add additional functionality to the computer system.

The components provided in the computer system 500 of FIG. 5 are those typically found in computer systems that may be suitable for use with embodiments of the present disclosure and are intended to represent a broad category of such computer components that are well known in the art. Thus, the computer system 500 of FIG. 5 can be a personal computer (PC), handheld computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN, and other suitable operating systems.

The processing for various embodiments may be implemented in software that is cloud-based. In some embodiments, the computer system 500 is implemented as a cloud-based computing environment, such as a virtual machine operating within a computing cloud. In other embodiments, the computer system 500 may itself include a cloud-based computing environment, where the functionalities of the computer system 500 are executed in a distributed fashion. Thus, the computer system 500, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 500, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

In various embodiments of the present disclosure, the audio monitoring device(s) and the noise monitoring system may be separate standalone systems, maintained by different entities. In other embodiments of the present disclosure, one or more audio monitoring device may be embedded within a different computing apparatus, such as a home assistant device (e.g., Amazon Echo). In this embodiment, the home assistant device can record the audio of the noise event and/or the corresponding context data. The noise monitoring system may operate as a software application running on the home assistant device, or on a remote server in communication with the home assistant device. Similarly, the noise monitoring system may operate as a software application running on a smart appliance, security system, or other existing computing networked hardware device.

Thus, methods and systems for crowdsourced noise monitoring are disclosed. Although embodiments have been described with reference to specific examples, it will be evident that various modifications and changes can be made to these example embodiments without departing from the broader spirit and scope of the present application. Therefore, these and other variations upon the exemplary embodiments are intended to be covered by the present disclosure. Accordingly, the specification and drawings are to be regarded in an illustrative rather than a restrictive sense.

What is claimed is:

1. A method for crowdsourced noise monitoring, the method comprising:
receiving, by at least one audio monitoring device, an audible sound of a noise event;
determining, by the at least one audio monitoring device, that a trigger condition for the noise event has been met;
upon meeting of the trigger condition for the noise event, recording, by the at least one audio monitoring device, the audible sound of the noise event, the recorded audible sound comprising at least a first audio file and context data associated with the noise event;
sending, by the at least one audio monitoring device, the first audio file and the context data to a noise monitoring system, the noise monitoring system in communication with the at least one audio monitoring device via a network;
storing, by the noise monitoring system, the first audio file and the context data associated with the noise event in a database; and
creating, by the noise monitoring system, a first log of the noise event, the first log comprising the first audio file and the context data associated with the noise event.

2. The method of claim 1, wherein the context data comprises at least one of location of the noise event, location of the at least one audio monitoring device, calibrated decibel level of the noise event, time and day of the noise event, known background noise sources, and user-input data.

3. The method of claim 1, wherein the trigger condition for the noise event comprises at least one of determining that a noise level of the noise event is above a threshold decibel level, a user instruction to record a noise event, or a computing device instruction to record the noise event.

4. The method of claim 3, wherein the threshold decibel level is determined by comparing the noise level of the noise event to a baseline noise level for a predefined area.

5. The method of claim 3, wherein the threshold decibel level is determined based on an average or median noise level for a predetermined time interval in a predefined area, the predetermined time interval being at least one of time of day, time of week, period of time, and combinations thereof.

6. The method of claim 1, further comprising:
receiving, by the noise monitoring system, one or more noise complaints from one or more users;
storing, by the noise monitoring system, the one or more noise complaints in the database;
creating, by the noise monitoring system, one or more second logs of the one or more noise complaints; and
analyzing, by the noise monitoring system, whether the one or more second logs of the one or more noise complaints are associated with the noise event, the analyzing comprising comparing the first log associated with the noise event to the one or more second logs of the one or more noise complaints.

7. The method of claim 6, wherein the one or more noise complaints are received by the noise monitoring system from at least one of telephone call, mobile phone call, mobile device application, smart device application, short message service (SMS) message, voicemail, email, and web server.

8. The method of claim 6, wherein each of the one or more second logs comprises at least one of second audio file, second context data, name of user, form in which the one or more noise complaints was received, and text of the one or more noise complaints.

9. The method of claim 6, further comprising:
analyzing, by the noise monitoring system, the first log associated with the noise event to determine type of the noise event; and
automatically forwarding, by the noise monitoring system, to at least one authorized user, the first log associated with the noise event and the one or more second logs associated with the one or more noise complaints, the at least one authorized user determined based on the type of the noise event.

10. The method of claim 6, further comprising:
encrypting the first log and the one or more second logs; and
allowing access to the first log and the one or more second logs only to an authorized user.

11. The method of claim 1, wherein the at least one audio monitoring device is configured to receive and record video, the recorded video further being sent to the noise monitoring system via the network.

12. A system for crowdsourced noise monitoring, the system comprising:
at least one audio monitoring device configured to:
receive audible sounds of a noise event;
determine that a trigger condition for the noise event has been met; and
upon meeting of the trigger condition for the noise event, record the audible sounds of the noise event, the recorded audible sounds comprising at least a first audio file and context data associated with the noise event; and
a noise monitoring system in communication with the at least one audio monitoring device via a network, the noise monitoring system configured to:
receive the first audio file and the context data associated with the noise event from the at least one audio monitoring device;
store the first audio file and the context data associated with the noise event in a database; and
create a first log of the noise event, the first log including at least the first audio file and the context data associated with the noise event.

13. The system of claim 12, wherein the context data comprises at least one of location of the noise event, location of the at least one audio monitoring device, calibrated decibel level of the noise event, time and day of the noise event, known background noise sources, and user-input data.

14. The system of claim 12, wherein the trigger condition for the noise event comprises at least one of determining that a noise level of the noise event is above a threshold decibel level, a user instruction to record a noise event, or a computing device instruction to record the noise event.

15. The system of claim 14, wherein the threshold decibel level is determined by comparing the noise level of the noise event to a baseline noise level for a predefined area.

16. The system of claim 14, wherein the threshold decibel level is determined based on an average or median noise level for a predetermined time interval in a predefined area, the predetermined time interval being at least one of time of day, time of week, period of time, and combinations thereof.

17. The system of claim 12, the noise monitoring system further configured to:
receive one or more noise complaints from one or more users;
store the one or more noise complaints in the database;
create one or more second logs of the one or more noise complaints; and
analyze whether the one or more second logs of the one or more noise complaints are associated with the noise event, the analyzing comprising comparing the first log associated with the noise event to the one or more second logs of the one or more noise complaints.

18. The system of claim 17, wherein the one or more noise complaints are received by the noise monitoring system from at least one of telephone call, mobile phone call, mobile device application, smart device application, short message service (SMS) message, voicemail, email, and web server.

19. The system of claim 17, wherein each of the one or more second logs comprises at least one of second audio file, second context data, name of user, form in which the one or more noise complaints was received, and text of the one or more noise complaints.

20. The system of claim 17, the noise monitoring system further configured to:
analyze the first log associated with the noise event to determine type of the noise event; and
automatically forward to at least one authorized user the first log associated with the noise event and the one or more second logs associated with the one or more noise complaints, the at least one authorized user being determined based on the type of the noise event.

21. The system of claim 17, the noise monitoring system further configured to:
encrypt the first log and the one or more second logs; and
allow access to the first log and the one or more second logs only to an authorized user.

22. A method for crowdsourced noise monitoring, the method comprising:
receiving at least one audio file and context data associated with a noise event;
storing the received at least one audio file and the context data in a database;
creating a first log of the received at least one audio file and the context data;

receiving a plurality of noise complaints from a plurality of users;

creating a plurality of second logs of the plurality of noise complaints;

analyzing the first log and the plurality of second logs to determine whether at least one of the plurality of noise complaints is related to the noise event; and if at least one of the plurality of noise complaints is related to the noise event, automatically forwarding the first log and at least one second log created from the at least one of the plurality of noise complaints related to the noise event to an authorized user.

\* \* \* \* \*